US010215385B2

(12) United States Patent
Klase et al.

(10) Patent No.: US 10,215,385 B2
(45) Date of Patent: *Feb. 26, 2019

(54) LIGHT MOUNTING SYSTEMS AND METHODS

(71) Applicant: Fluence Bioengineering, Austin, TX (US)

(72) Inventors: Nicholas Klase, Austin, TX (US); Randall Johnson, Austin, TX (US)

(73) Assignee: Fluence Bioengineering, Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/861,226

(22) Filed: Jan. 3, 2018

(65) Prior Publication Data

US 2018/0128462 A1 May 10, 2018

Related U.S. Application Data

(63) Continuation of application No. 15/338,776, filed on Oct. 31, 2016, now Pat. No. 9,951,941.

(Continued)

(51) Int. Cl.
*A01G 7/04* (2006.01)
*F21V 21/14* (2006.01)
(Continued)

(52) U.S. Cl.
CPC .............. *F21V 21/14* (2013.01); *A01G 7/045* (2013.01); *A01G 9/143* (2013.01); *A01G 9/20* (2013.01); *A47B 57/48* (2013.01); *A47B 81/00* (2013.01); *B62B 3/005* (2013.01); *B62B 5/00* (2013.01); *F21V 19/02* (2013.01); *F21V 33/0012* (2013.01); *A47B 2220/0077* (2013.01); *B62B 2202/70* (2013.01); *B62B 2501/02* (2013.01);

(Continued)

(58) Field of Classification Search
CPC ...... F21V 21/14; F21V 33/0012; F21V 19/02; F21V 14/02; F21W 2131/301; F21Y 2115/01; B62B 5/00; B62B 3/005; B62B 2202/70; B62B 2501/02; B62B 2501/06; A01G 9/143; A01G 7/045; A01G 9/20; A47B 81/00; A47B 57/48; A47B 2220/0077; Y02P 60/146
See application file for complete search history.

(56) References Cited

U.S. PATENT DOCUMENTS

| 4,994,943 A | * | 2/1991 | Aspenwall | ................ F21S 8/00 362/217.16 |
| 2008/0121146 A1 | * | 5/2008 | Burns | ..................... A47F 5/101 108/23 |

(Continued)

*Primary Examiner* — Alexander K Garlen
(74) *Attorney, Agent, or Firm* — Pierson IP, PLLC

(57) ABSTRACT

Embodiments disclosed herein describe systems and methods associated with light mounting systems. Embodiments may include lighting shelves that are configured to be mounted to a fixed structure, such as to a wall or supports within a room via a cantilever design that is mounted to strut channels. The lighting shelves may be anchored at only a single end to the strut channels, and the lighting shelves may protrude away from the strut channels. The lighting shelves may have a sufficient width and length to cover an entire region of interest below the lighting shelves, which may enable to lighting shelves to uniformly distribute light to plants.

20 Claims, 5 Drawing Sheets

Related U.S. Application Data

(60) Provisional application No. 62/249,791, filed on Nov. 2, 2015.

(51) Int. Cl.

| | | |
|---|---|---|
| *F21V 33/00* | (2006.01) | |
| *F21V 19/02* | (2006.01) | |
| *A47B 81/00* | (2006.01) | |
| *A47B 57/48* | (2006.01) | |
| *A01G 9/20* | (2006.01) | |
| *B62B 3/00* | (2006.01) | |
| *B62B 5/00* | (2006.01) | |
| *A01G 9/14* | (2006.01) | |
| *F21Y 115/10* | (2016.01) | |
| *F21V 14/02* | (2006.01) | |
| *F21W 131/301* | (2006.01) | |

(52) U.S. Cl.
CPC ........... *B62B 2501/06* (2013.01); *F21V 14/02* (2013.01); *F21W 2131/301* (2013.01); *F21Y 2115/10* (2016.08); *Y02P 60/146* (2015.11)

(56) References Cited

U.S. PATENT DOCUMENTS

| | | | |
|---|---|---|---|
| 2013/0286651 A1* | 10/2013 | Takeuchi | A47F 11/10 |
| | | | 362/249.02 |
| 2015/0107154 A1* | 4/2015 | Visser | A01G 9/143 |
| | | | 47/66.6 |
| 2016/0230946 A1* | 8/2016 | Floersch | A47F 3/001 |

* cited by examiner

LIGHT MOUNTING SYSTEMS AND METHODS

CROSS-REFERENCE TO RELATED APPLICATIONS

This application claims a benefit of priority under 35 U.S.C. § 119 to Provisional Application No. 62/249,791 filed on Nov. 2, 2015, and this application is a continuation of U.S. Ser. No. 15/338,776, which are fully incorporated herein by reference in their entirety.

BACKGROUND INFORMATION

Field of the Disclosure

Examples of the present disclosure are related to systems and methods for light mounting systems. More particularly, embodiments disclose light mounting systems with a cantilever design mounted to strut channels, wherein a cart may be inserted and removed from the light mounting system.

Background

Grow lights or plant lights are artificial light sources designed to stimulate plant growth by emitting an electromagnetic spectrum appropriate for photosynthesis. Grow lights attempt to provide a light spectrum similar to that of the sun or to provide a spectrum tailored to the needs of plants being cultivated.

Conventional grow lights are mounted directly to shelves, and plants are positioned below the grow lights. To utilize conventional grow lights, farmers are required to actively load and unload the plants onto each shelf. This creates extra labor costs and time.

Alternatively, conventional grow lights are mounted to frames positioned on both sides of a cart, wherein the plants are positioned on the cart. The cart is then moved between the frames. The plants receive light emitted from the grow lights, which are positioned on each side of the cart. This causes plants to stretch towards the sides of the cart and the light, which affects the plants development and/or shape. Additionally, this causes uneven growth since the plants positioned on the side of the carts receive much higher light intensities than plants centrally located on the cart. These conventional systems are also expensive due to the extra number of lights required.

Accordingly, needs exist for more efficient and effective light mounting systems with a cantilever design that is mounted to strut channels, wherein the lighting mounting systems may remain at a fixed location and carts may be moved into the light mounting systems.

SUMMARY

Embodiments disclosed herein describe systems and methods associated with LED lighting mounting systems. Embodiments may include lighting shelves that are configured to be mounted on a fixed structure, such as to a wall or supports within a room. The lighting selves may be coupled to the fixated structure utilizing a cantilever design that is mounted to strut channels. In embodiments, only a single end of the lighting shelves may be anchored to the strut channels such that the lighting shelves may protrude away from the strut channels. The lighting shelves may have a sufficient width and length to cover an entire region of interest below the lighting shelves, which may enable the lighting shelves to uniformly distribute light to plants.

Utilizing embodiments, the lighting shelves may remain in a fixed position, and a cart or other device may be moved into the lighting system. This may reduce, decrease, etc. an amount of labor required to move plants within the lighting systems. To further reduce the amount of labor to move the plants within the lighting systems, the carts may be loaded and unloaded via robots. Additionally, embodiments may produce very uniform plants due to the top-down lighting distribution, wherein the top-down lighting distributes uniform lighting to plants positioned below the lighting shelves.

Embodiments of the lighting system may include a support frame and lighting shelves. The support frame may be comprised of various rigid materials, such as metal, plastic, etc. The support frame may be strut channels and include a standardized formed structural system with strut channels. The strut channels may be configured to receive the lighting shelves, wherein the lighting shelves may be coupled and decoupled from the strut channels. In embodiments, a plurality of lighting shelves may be coupled to the support frames at different vertical offsets and/or along the same horizontal plane.

Each of the lighting shelves may include coupling mechanisms, housing, and lights. The lighting shelves may have a cantilever design configured to create overhanging structures without external bracing on both ends of the lighting shelves, which may be in contrast to conventional support structures that apply their loads at both ends.

The coupling mechanisms may be positioned on a first end of the lighting shelves, and may be configured to be removably coupled with the strut channels.

The housing may be a container, shell, casing, etc. that is configured to extend from the first end of the lighting shelf to the second end of the lighting shelf. The housing may have sufficient length to extend across a cart, wherein plants may be positioned on the cart. The housing may be configured to secure the lights to the lighting shelves. The lights may be LED lights or any other type of lights configured to stimulate plant growth by emitting an electromagnetic spectrum appropriate for photosynthesis. The lights may extend across the housing, such that plants positioned below the lights may receive uniform light distribution.

In embodiments, a cart with plants positioned on a plurality of shelves may move into the lighting system. Responsive to moving the cart within the lighting system, each of the shelves associated with the cart may be positioned below a lighting shelf associated with the lighting system. This may eliminate labor required to move plants because the cart may be moved via robots, while producing uniform plants due to the top-down light distribution across the plants on the shelves.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Figure 1:
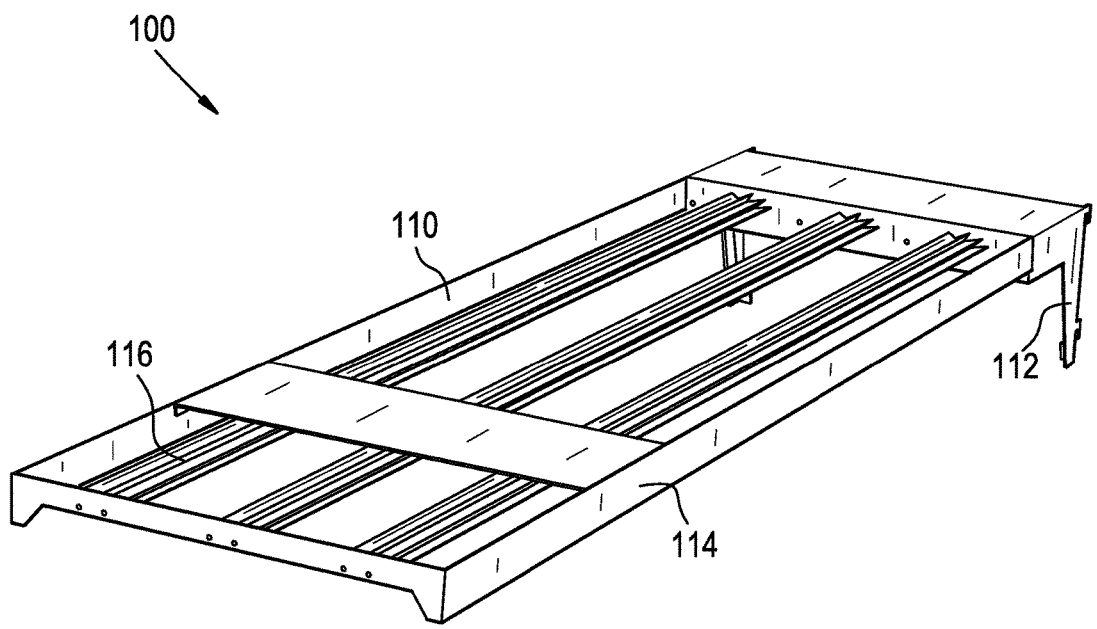
FIG. 1 depicts a lighting system, according to an embodiment.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments of the present disclosure. Also, common but well-understood elements that are useful or necessary in a commercially feasible embodiment are often not depicted in order to facilitate a less obstructed view of these various embodiments of the present disclosure.

DETAILED DESCRIPTION

In the following description, numerous specific details are set forth in order to provide a thorough understanding of the present embodiments. It will be apparent, however, to one having ordinary skill in the art that the specific detail need not be employed to practice the present embodiments. In other instances, well-known materials or methods have not been described in detail in order to avoid obscuring the present embodiments.

Embodiments disclosed herein describe systems and methods associated with LED lighting systems. Embodiments may include lighting shelves that are configured to be mounted to a fixed structure, such as to a wall or supports within a room via a cantilever design that is mounted to strut channels. The lighting shelves may be anchored at only a single end to the strut channels, and the lighting shelves may protrude away from the strut channels. The lighting shelves may have a sufficient width and length to cover an entire region of interest below the lighting shelves, which may enable to lighting shelves to uniformly distribute light to plants.

FIG. 1 depicts one embodiment of a lighting system 100. Lighting system 100 may include a strut channels support frame (not shown) and lighting shelves 110.

The support frame may be strut channels comprised of various rigid materials, such as metal, plastic, etc. The support frame may be configured to be coupled to a permanent structure, such as the wall of a building. In other embodiments, the support frame may be a standalone structure that may be moved between various locations. For example, the support frame may be a self-standing structure positioned in the middle of a room, with strut channels positioned on at least two opposite sides of the support frame.

Each side of the support frame may include strut channels columns with uniform strut channels. The strut channels may be positioned at even intervals along a vertical axis of each side of the support frame. The strut channels may be configured to receive lighting shelves 110, wherein lighting shelves 110 may be coupled and decoupled from the strut channels. In embodiments, a plurality of lighting shelves 110 may be coupled to the support frames at different vertical offsets based on the positioning of lighting shelves 110 on the strut channels. Additionally, different lighting shelves 110 may also be positioned at different vertical offsets along different sides of the support fame. This may enable carts of uniform size to be inserted into the support frame, or enable carts of different sizes to be inserted into the support frame. Furthermore, by having lighting shelves 110 positioned on at different vertical offsets, which may be the same distance between each other or be different distances between each other, lighting system 100 may utilize a cart with shelves with different distances between each shelf on the cart. Thus, plants requiring different levels of light may be positioned on different shelves of the cart and have a different vertical distance between a top of the cart and the lighting shelf.

Lighting shelves 110 may be configured to be coupled with the support frame via a cantilever design. In embodiments, only a single side of lighting shelves 110 may protrude away from the support frame. Lighting shelves 110 may include coupling mechanisms 112, housing 114, and lights 116.

Coupling mechanisms 112 may be positioned on a first end of lighting shelves 110, and may be configured to be removably coupled with the strut channels on the support frame. In embodiments, coupling mechanisms 112 may include projections that are configured to be inserted into the strut channels. Responsive to inserting the projections into the strut channels, a load of lighting shelf 110 may be transferred to the support frame. By positioning coupling mechanisms 112 on only a single side of lighting shelf 110, lighting shelf 110 may be an overhanging structure that doesn't apply its load at both ends.

Housing 114 may be a container, shell, casing, etc. that is configured to extend from the first end of lighting shelf 110 to a second end of lighting shelf 110. Housing 114 may have a sufficient length and width to fully overlay a surface of a cart, when a cart is inserted into lighting shelf 110. In embodiments, the width and length of housing 114 may be substantially similar to that of a surface of the cart.

Light sources 116 may be an artificial light source that is configured to stimulate plant growth by emitting light. For example, light sources 116 may be a plurality of LEDs. Light sources 116 may be utilized to create light or supplement natural light to the area of interest. Light sources 116 may provide a light spectrum that is similar to the sun, or provide a spectrum that is tailored to the needs of particular pants being cultivated. Light sources 116 may be configured to be inserted into housing 114, such that light sources 116 extend from the first end of housing 114 to the second end of housing 114. In embodiments, light sources 116 may be configured to be evenly spaced across a width of housing 114 to uniformly distribute light on an area of interest on a cart positioned below light shelf 110. However, in other embodiments, light sources 116 may not be evenly spaced across a width of housing 114 to non-uniformly distribute light.

In embodiments, a cart with plants positioned on shelves may move into the lighting system 100. When moving the cart into the lighting system, a first end of the cart may be positioned proximate to or adjacent to the fixed structure, such as a wall. The second end of the cart may be unobstructed or not covered, such that the cart may be removed from lighting system 100 via the second end of the cart. Responsive to moving the cart within the lighting system 100, each of the shelves associated with the cart align with a corresponding lighting shelf 110, wherein each shelf on the cart is positioned below a corresponding lighting shelf 110. When the cart is inserted into lighting system 100, the cantilever design of lighting shelves 110 may protrude across a surface area of the shelves on the cart. Therefore, plants positioned on the shelves of the cart may receive uniform distribution of light, while allowing the cart to be easily and efficiently inserted and removed from the lighting system 100.

In further embodiments, automated systems using robots, tracks, etc. may positioned the carts inside of lighting system 100 and remove the carts from lighting system 100. This may eliminate labor required to manually move plants, while producing uniform plants due to the top-down light distribution across the plants on the shelves.

Figure 2:
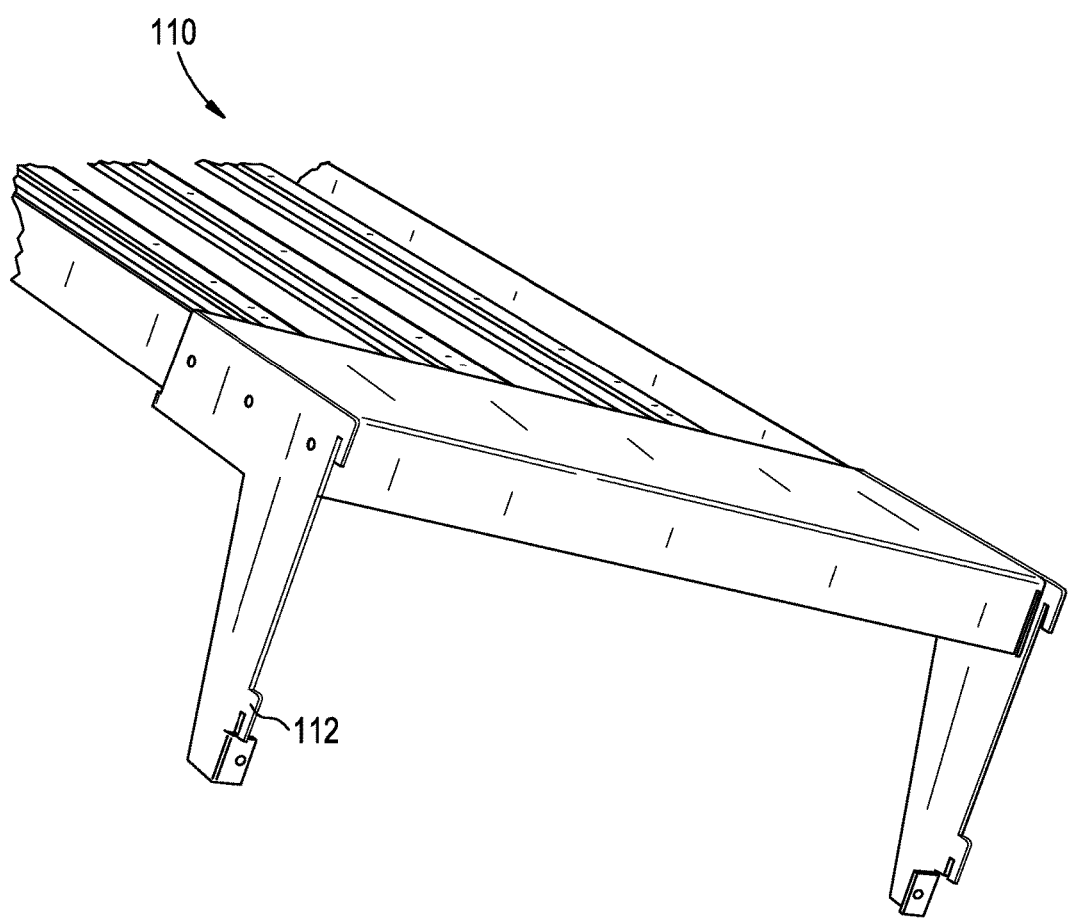
FIG. 2 depicts a perspective view of a first end of a lighting shelf, according to an embodiment.

FIG. 2 depicts a perspective view of a first end of lighting shelf 110, according to an embodiment. Elements depicted in FIG. 2 are described above, and for the sake of brevity a further description of these elements is omitted.

As depicted in FIG. 2, coupling mechanisms 112 may be positioned on a first end of lighting shelf 110. In embodiments, coupling mechanisms 112 may be configured to be positioned on both sides of first end of lighting shelf 110 to distribute the load of lighting shelf 110 across the support frame. Coupling mechanisms 112 may include hooks, pegs, hangers, etc. that are configured to be inserted into strut channels. Responsive to inserting coupling mechanisms 112 into the strut channels, the load of lighting shelf 110 may be applied to the support frame.

Figure 3:
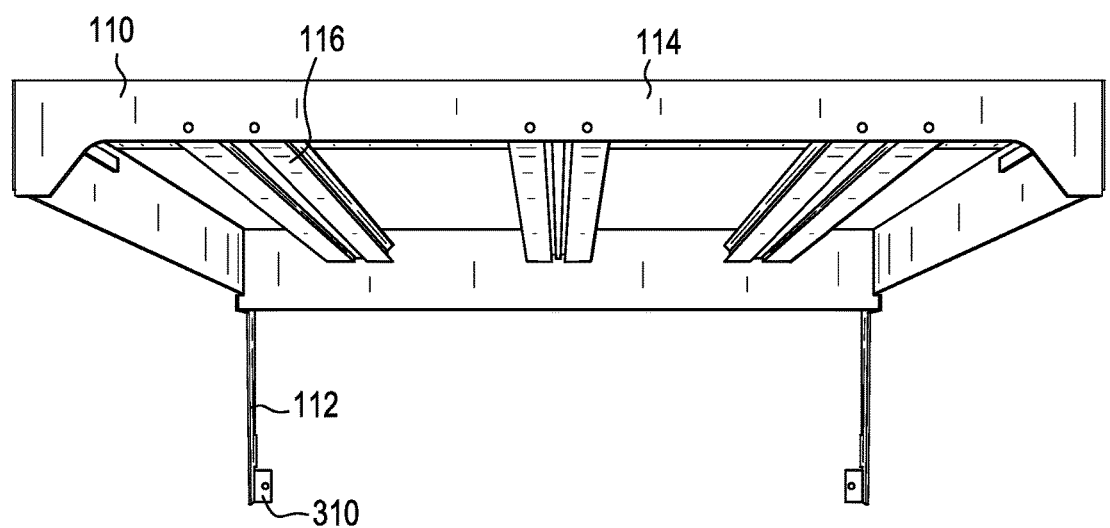
FIG. 3 depicts a front view of a lighting shelf, according to an embodiment.

FIG. 3 depicts a front view of lighting shelf 110, according to an embodiment. Elements depicted in FIG. 3 are described above, and for the sake of brevity a further description of these elements is omitted.

As depicted in FIG. 3, light sources 116 may be configured to extend across housing 114 from the first end of lighting shelf 110 to the second end of lighting shelf 110. In further embodiments, light sources 116 may be configured to independently move horizontally within housing 114 to change the light distribution on an area of interest. Thus, a horizontal distance between each of the light sources 116 may be changed.

As also depicted in FIG. 3, coupling mechanisms 112 may include secondary supports 310. Secondary supports 310 may be positioned in a direction that is perpendicular to coupling mechanisms 112, and may be configured to further distribute the load of lighting shelf 110 to a support frame. In embodiments, a screw, bolt, etc. may be configured to be inserted through secondary supports 310, and inserted into a support frame.

Figure 4:
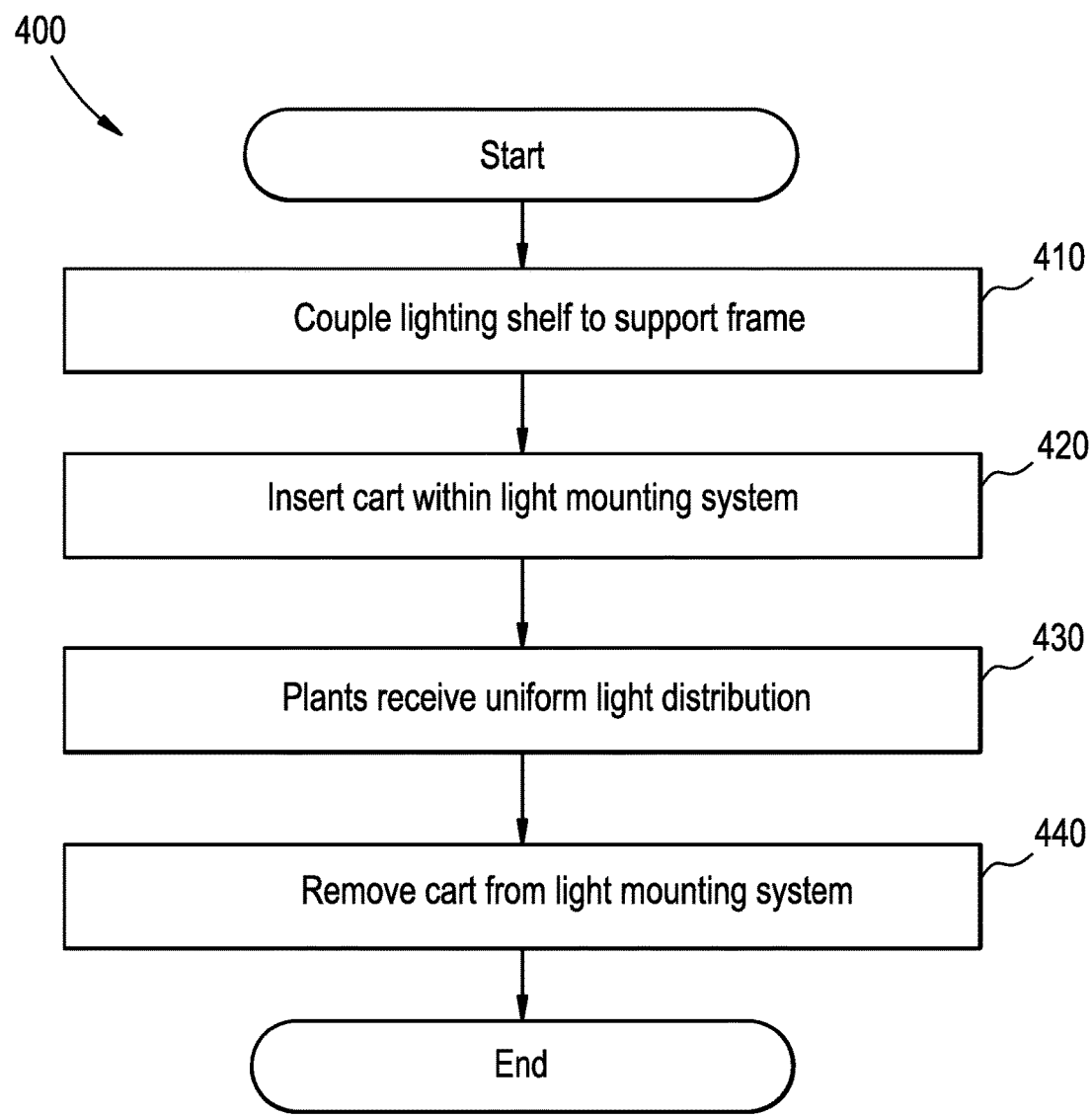
FIG. 4 illustrates a method for utilizing a lighting system, according to an embodiment.

FIG. 4 illustrates a method 400 for utilizing a lighting system according to an embodiment. The operations of method 400 presented below are intended to be illustrative. In some embodiments, method 400 may be accomplished with one or more additional operations not described, and/or without one or more of the operations discussed. Additionally, the order in which the operations of method 400 are illustrated in FIG. 4 and described below is not intended to be limiting.

At operation 410, a plurality of lighting shelves may be coupled to a support system. The lighting shelves may be coupled to the support system by inserting coupling mechanisms positioned at the first end of the lighting shelves within strut channels within the support system. In embodiments, the lighting shelves may be inserted into the support systems at vertical offsets that corresponding with shelves on a cart, wherein a lighting shelf is positioned above each shelf on the cart.

At operation 420, the cart may be inserted within the light mounting system. The cart may be inserted into the light mounting system via tracks, robots, etc., wherein each shelf on the cart may be positioned below a lighting shelf coupled to the support system. In embodiments, plants may be positioned on each shelf of the cart.

At operation 430, responsive to inserting the cart with the plants within the light mounting system, lights positioned within each lighting shelf may uniformly distribute light onto the shelves on the cart.

At operation 440, the cart may be removed from the light mounting system.

Figure 5:
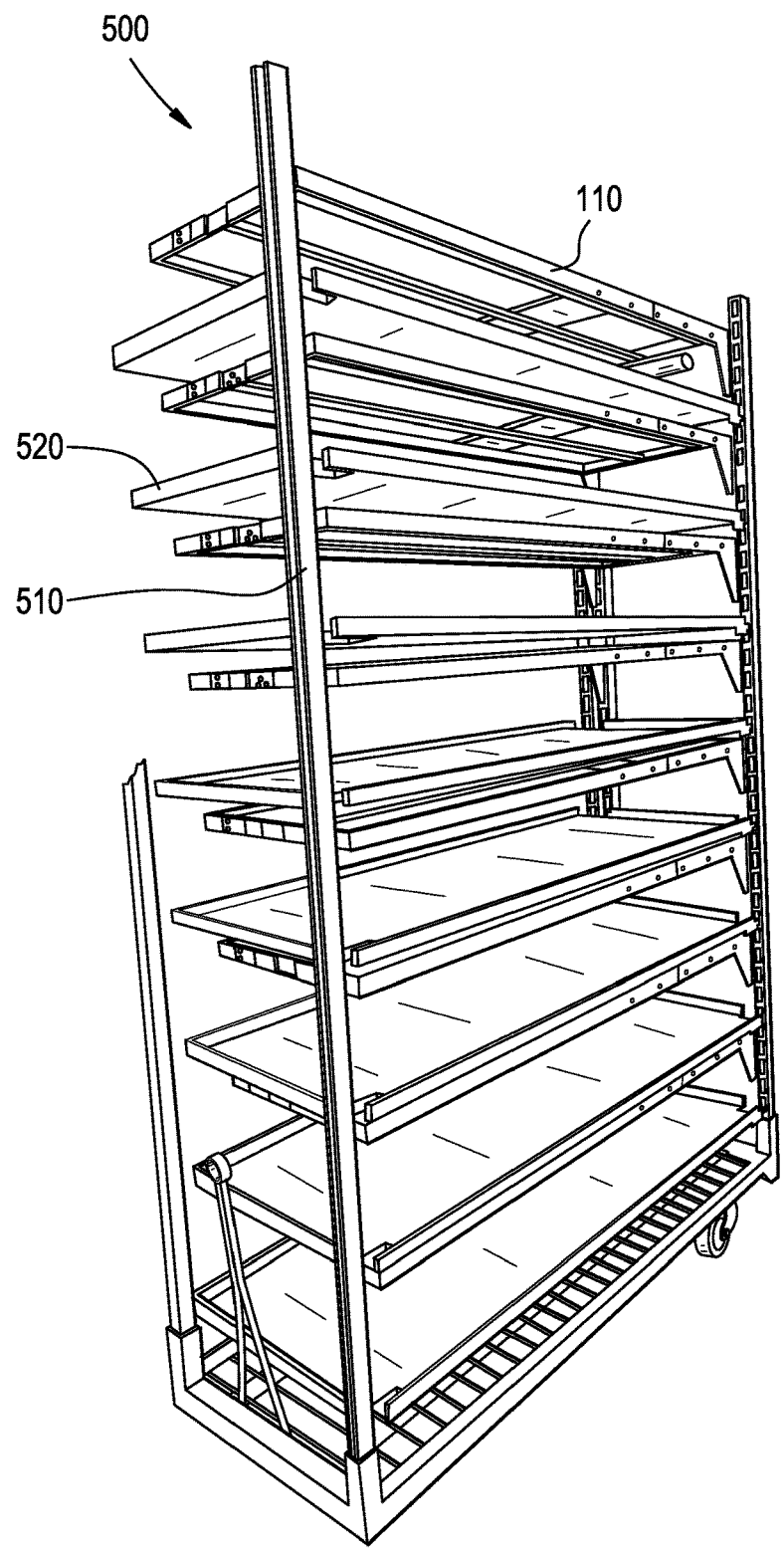
FIG. 5 depicts a cart being positioned around a lighting system, according to an embodiment.

FIG. 5 depicts a lighting system 500, wherein a cart 510 is interfaced within a plurality of lighting shelves 110. As depicted in FIG. 5, a cart 510 with a plurality of cart shelves 520 may be interfaced with a plurality of lighting shelves 110. Each of the cart shelves 520 may be positioned below a corresponding lighting shelf 110.

Furthermore, cart 510 may have a width and length that is wider and longer than lighting shelves 110. Thus, cart 510 may be inserted around lighting shelves 110. Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

The flowcharts and block diagrams in the flow diagrams illustrate the architecture, functionality, and operation of possible implementations of systems, methods, and computer program products according to various embodiments of the present invention. In this regard, each block in the flowcharts or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. A lighting system comprising:
a plurality of lighting shelves, each lighting shelf including a first end and a second end, the first end coupled with strut channels, and the second end being an open end, a width across the first end being shorter than a length from the first end to the second end;
a light housing including a plurality of light sources positioned within each lighting shelf, the light housing extending from the first end to the second end; and
a cart with a plurality of cart shelves, the cart shelves being configured to be inserted between the plurality of lighting shelves.

2. The lighting system of claim 1, wherein each lighting shelf includes a plurality of light housings, and each of the plurality of light housings is configured to move along the width of the lighting shelf.

3. The lighting system of claim 2, wherein the plurality of light housings on the lighting shelf are evenly spaced apart.

4. The lighting system of claim 2, wherein the plurality of light housings on the lighting shelf are not evenly spaced apart.

5. The lighting system of claim 1, wherein a vertical distance between the plurality of lighting shelves is the same.

6. The lighting system of claim 1, wherein a vertical distance between the plurality of lighting shelves is different.

7. The lighting system of claim 1, wherein each cart shelf corresponds with each lighting shelf.

8. The lighting system of claim 7, wherein each lighting shelf is configured to uniformly distribute light onto each cart shelf.

9. The lighting system of claim 1, wherein the first end of each lighting shelf is configured to be decoupled from the strut channels at a first vertical offset.

10. The lighting system of claim 1, wherein each lighting shelf includes between three to six light sources per lateral distance of twenty four inches.

11. A method for a lighting system comprising:
coupling a first end of a plurality of lighting shelves with strut channels, a second end of the plurality of lighting shelves being an open end, wherein a width across the first end being shorter than a length from the first end to the second end;
positioning a light housing including a plurality of light sources within each lighting shelf, the light housing extending from the first end to the second end; and
inserting a plurality of cart shelves on a cart between the plurality of lighting shelves.

12. The method of claim 11, further comprising: moving a plurality of light housings on each lighting shelf along the width of the lighting shelf.

13. The method of claim 12, further comprising: evenly spacing the plurality of light housings on the lighting shelf.

14. The method of claim 12, further comprising: not evenly spacing the plurality of light housings on the lighting shelf.

15. The method of claim 11, further comprising: positioning the plurality of lighting shelves with the strut channel to make a vertical distance between each of the plurality of lighting shelves the same.

16. The method of claim 11, further comprising: positioning the plurality of lighting shelves with the strut channel to make a vertical distance between each of the plurality of lighting shelves not the same.

17. The method of claim 11, wherein each cart shelf corresponds with each lighting shelf.

18. The method of claim 17, wherein each lighting shelf is configured to uniformly distribute light onto each cart shelf.

19. The method of claim 11, further comprising: decoupling the first end of each lighting shelf from the strut channels at a first vertical offset.

20. The method of claim 11, wherein each lighting shelf includes between three to six light sources per lateral distance of twenty four inches.

* * * * *